United States Patent [19]

Godlewski

[11] 4,220,727

[45] Sep. 2, 1980

[54] METHOD OF MOLDING POLYURETHANES HAVING MOLD RELEASE PROPERTIES

[75] Inventor: Robert E. Godlewski, Mahopac, N.Y.

[73] Assignee: Union Carbide Corporation, New York, N.Y.

[21] Appl. No.: 923,895

[22] Filed: Jul. 12, 1978

Related U.S. Application Data

[62] Division of Ser. No. 726,215, Sep. 24, 1976, Pat. No. 4,111,861.

[51] Int. Cl.$^2$ .................. C08G 18/14; C08G 18/08
[52] U.S. Cl. ................. 521/110; 260/18 TN; 264/300; 521/124; 521/125; 521/128; 528/48; 528/52; 528/55; 528/57
[58] Field of Search ............... 528/48, 52, 55, 57; 521/110, 124, 125, 128; 264/300

[56] References Cited

U.S. PATENT DOCUMENTS

| | | | |
|---|---|---|---|
| 2,957,899 | 10/1960 | Black et al. | 260/448.2 |
| 3,041,295 | 6/1962 | Wiech et al. | 521/125 |
| 3,239,480 | 3/1966 | Windemuth et al. | 528/57 |
| 3,243,475 | 3/1966 | Reischl et al. | 521/110 |
| 3,267,047 | 8/1966 | Gmitter et al. | 528/55 |
| 3,347,804 | 10/1967 | Buckley | 521/124 |
| 3,391,091 | 7/1968 | Considine et al. | 521/124 |
| 3,399,247 | 8/1968 | Windemuth et al. | 521/110 |
| 3,413,390 | 11/1968 | Heiss | 521/121 |
| 3,580,873 | 5/1971 | Bianca | 521/124 |
| 3,605,848 | 9/1971 | Lombardi et al. | 521/124 |
| 3,607,397 | 9/1971 | Watters | 264/39 |
| 3,624,190 | 11/1971 | Cekada et al. | 521/51 |
| 3,634,345 | 1/1972 | Diehr et al. | 528/57 |
| 3,640,769 | 2/1972 | Watters | 264/39 |
| 3,694,530 | 9/1972 | Wolfe | 521/51 |
| 3,714,077 | 1/1973 | Cobbledick et al. | 521/124 |
| 3,725,105 | 4/1973 | Chase | 427/140 |
| 3,726,827 | 4/1973 | Jones et al. | 528/48 |
| 3,726,952 | 4/1973 | Boden et al. | 521/129 |
| 3,793,240 | 2/1974 | Smith | 521/125 |
| 3,897,410 | 7/1975 | Olstowski et al. | 528/48 |
| 3,933,697 | 1/1976 | Fujii et al. | 521/128 |
| 3,940,517 | 2/1976 | De Leon | 521/125 |
| 3,954,684 | 5/1976 | Fanissey et al. | 521/128 |
| 3,980,594 | 9/1976 | Fabris et al. | 528/52 |
| 4,024,088 | 5/1977 | Godlewski | 521/108 |
| 4,024,090 | 5/1977 | von Bonin et al. | 264/300 |
| 4,076,695 | 2/1978 | Keil | 528/48 |

FOREIGN PATENT DOCUMENTS

| | | | |
|---|---|---|---|
| 631047 | 11/1961 | Canada | 528/57 |
| 970497 | 9/1964 | United Kingdom | 528/48 |

OTHER PUBLICATIONS

D.O.S. 2,251,649, Dow Chemical, Apr. 26, 1973.

*Primary Examiner*—H. S. Cockeram
*Attorney, Agent, or Firm*—Richard J. Gallagher

[57] ABSTRACT

This invention relates to compositions and methods for forming polyether polyurethanes utilizing internal release additives for the purpose of facilitating mold release in the production of molded objects. The invention discloses four classes of internal release additives: (1) mixtures of aliphatic or aryl carboxylic acid and a polar metal compound; (2) caboxyalkylsiloxanes; (3) aliphatic glyoximes; and (4) aralkyl quaternary ammonium salts.

23 Claims, No Drawings

METHOD OF MOLDING POLYURETHANES HAVING MOLD RELEASE PROPERTIES

This application is a division of our prior U.S. application Ser. No. 726,215 filed Sept. 24, 1976, now U.S. Pat. No. 4,111,861.

BACKGROUND OF THE INVENTION

1. Field of the Invention

Polyether polyurethane moldings are being increasingly used in the manufacture of automobiles and furniture and in home construction. Molded polyether polyurethane foams are especially important because they are lightweight and are resistant to moisture, weather, temperature extremes, and aging. As an illustration, molded, foamed polyether polyurethane elastomers have become of special interest in the manufacture of force-reducing impact media such as safety impact bumpers for automotive vehicles and impact resistant automotive fascia.

The high demand for molded polyether polyurethane articles requires that they be produced in the largest numbers in the shortest possible time. Polyurethane-forming mixtures are eminently suited for mass production because the reactants are liquid, that is, they are pumpable, and are quick-reacting. The problem has existed, however, in providing adequate mold release in the shortest possible time to take fullest advantage of the unique capabilities of the polyurethane systems.

As an illustration, it has been proposed that automotive bumpers and fascia be manufactured by pumping a polyether polyol and isocyanate prepolymer through a Krauss-Maffei mixing head where intimate mixing of the polyurethane components will occur in a matter of seconds. The mixed, uncured mixture will then proceed, under high pressure, to a mold cavity where the mixture will cure to a solid or microcellular elastomer. The cured polyurethane will be removed in short order to provide a clean mold capable of accepting additional mixture. Cycle times being discussed (from initial filling of the mold to ejection of the cured polyurethane) are in the order of one to three minutes. To achieve these production cycle times, the utilization of an internal release agent in the urethane ingredients is essential.

The field of this invention relates to the quick release of polyurethane compositions from molds in which they are formed and shaped.

2. Description of the Prior Art

Heretofore, release of molded articles from molds in which they have been formed has been achieved by coating the surface of the mold cavity with an agent which facilitates release of the molded article from the walls of the mold cavity. Procedures such as this are described in U.S. Pat. Nos. 3,694,530, 3,640,769, 3,624,190, 3,607,397 and 3,413,390. This procedure has severe drawbacks. The agent, after molding, adheres either to the walls of the mold cavity or to the surface of the molded article or, in the usual case, to both. After multiple moldings and application of release agent, the agent tends to build up on the surface of the mold cavity walls and eventually covers and obscures any detail on the mold cavity surface desired to be imparted to the molded article. Also, the presence of release agent adhering to the surface of the molded article can impede subsequent operations on the article, such as painting or adhering operations. While it is possible to clean the surfaces of molded articles in preparation for painting or adhering operations, this adds to the time and expense of production. Additionally, the need to reapply the release agent after each molding or a limited number of moldings interrupts the molding operation and slows down output.

As an illustration, current practice in molding urethanes is to apply an externally applied substance to the mold cavity. The externally applied release agents are applied by spray or wipe-on techniques. Generally, the release agent adheres to the surface of the molded urethane, thus removing the deposit applied to the mold surface. This presents problems in that additional release agent has to be applied to the mold, and the surface of the urethane has to be degreased in order for paint to adhere to the urethane. Cycle times are long for such a process, which adds to the cost of manufacture of each urethane part.

U.S. Pat. No. 3,726,952 describes the use of additives for polyurethane foam forming mixtures for the purpose of imparting mold release properties. The additives described contain at least 25 carbon atoms and are salts of an aliphatic carboxylic acid and either a primary amine or an amine containing amide or ester groups. While these additives may provide the release property to some extent, they have not been found to provide effective release when used as the sole mold release additives. In addition, these additives contain fatty acid groups which cause cure interference to the urethane foam formulation.

U.S. Pat. No. 3,725,105 describes the addition of silicones (siloxanes) to epoxy coating compositions to impart a release surface to the coating after curing and thus prevent the adhesion of dirt and other foreign material thereto. However, the silocones of that patent include siloxanes containing a monovalent hydrocarbon radical or a halogenated monovalent hydrocarbon radical and do not encompass the carboxyalkyl siloxanes of the present invention.

While particularly unique organophosphorus internal mold release additives can be employed in polyurethanes as described in co-pending application Ser. No. 536,956 filed Dec. 23, 1974, now U.S. Pat. No. 4,024,088, there is room for still further improvement with respect to mold release additives.

SUMMARY OF THE INVENTION

The invention relates to compositions and methods for manufacturing polyurethanes by utilizing an organic compound having at least two active hydrogen atoms per molecule reactive with the polyisocyanate to form the polyurethane and at least one of four specific classes of internal mold release agents. Such internal release agents, when added to polyether polyurethane-forming compositions adapted to produce cured articles in contact with metal substrates (e.g. in a mold cavity), permit the release of such molded articles from the substrate using a minimal amount of release force. The cured polyurethane can be easily removed from the substrate, thus eliminating the need for the use of a release agent applied to the substrate.

The internal release agents include: (1) mixtures of an aliphatic or aryl carboxylic acid and a polar metal compound; (2) carboxyalkylsiloxanes; (3) aliphatic glyoximes, and (4) aralkyl quaternary ammonium salts. These internal release additives are mixed with the active hydrogen-containing organic compound (polyol) or the polyisocyanate or both.

The urethanes containing the additives of this invention exhibit effective initial and multiple release from a nickel-plated steel substrate upon which the urethane has cured. Release from a nickel-plated steel substrate is especially significant in that nickel-plated steel molds are widely used in commercial urethane production.

The mold release additives of this invention are useful in the production of micro-cellular polyurethanes and polyurethane elastomers such as those used in the manufacture of energy-absorbing bumpers and fascia. As will be apparent to those skilled in the art, while the present invention is described herein with particular reference to micro-cellular and non-cellular polyurethane elastomers, the invention is applicable to the other types of polyether polyurethanes including the rigid and flexible types and those in between.

DESCRIPTION OF THE PREFERRED EMBODIMENTS

This invention relates to certain additives which when combined with a polyisocyanate and a polyether polyol provides an effective release property in the cured urethane. The additives are comprised of one of the following classes of release agents: (1) mixtures of an aliphatic or aryl carboxylic acid and a polar metal compound; (2) carboxyalkylsiloxanes; (3) aliphatic, glyoximes; and (4) aralkyl quaternary ammonium salts. Each of these internal release additives is readily dissolved or dispersed in one or both of the urethane components, and such additives do not separate over time. Moreover, these additives may be incorporated directly into the urethane formulation since no prior separation is necessary.

The aliphatic or aryl carboxylic acids of category (1) contain carboxyl groups which can interfere with the cure rate of the polyurethane elastomer. This interference can be related to the reaction of the fatty acid with the catalyst employed in the polyurethane-forming reaction mixture, thereby reducing the amount of effective catalyst in the mixture. One method of maintaining catalysis of the polyol-isocyanate reaction is to increase the catalyst loading in the reaction mixture, thereby overcoming the cure intereference associated with the presence of the fatty acid. However, this method is costly and is therefore undesirable. Another method of overcoming the cure interference caused by the fatty acid is to add a polar metal compound, preferably in the form of a relatively inexpensive salt (e.g. sodium carbonate). Thus, category (1) of this invention relates to the use of a fatty acid in combination with a polar metal compound as internal mold release additives in polyurethane elastomer formation.

The carboxylic acids useful in category (1) of the invention include linear carboxylic acids such as octanoic, nonanoic, decanoic, undecanoic, dodecanoic, tridecanoic, tetradecanoic, pentadecanoic, hexadecanoic, heptadecanoic, octadecanoic, nonadecanoic, cicosanoic, heneicosanoic, docosanoic, tricosanoic, tetracosanoic, pentacosanoic, hexacosanoic, heptacosanoic, octacosanoic, nonacosanoic, triacontanoic, hentricontanoic, dotriacontanoic, tetratriacontanoic, and sentatrioacontanoic acid. In addition, the carboxylic acids useful in the instant invention may contain branched carbon chains or pendant carboxyl groups (e.g. iso-lauric or iso-stearic acid).

The polar metal compounds useful in category (1) of the invention contain a metal component selected from the group consisting of bismuth, lead, tin, sodium potassium, and lithium.* The metallic ions of this invention are present in the urethane mixture in a minor amount relative to the weight parts of fatty acid that are introduced.

*A comprehensive listing of metallic compounds and the associated activity is presented in J. H. Saunders & K. C. Frisch, Polyurethanes: Chemistry and Technology, Part I, pp. 167–169 (1962).

The carboxyalkylsiloxanes useful in this invention have the formula:

wherein R is a monovalent hydrocarbon radical, R' is a divalent hydrocarbon radical containing up to 18 carbon atoms which separates the carboxy group from the silicon atom by at least two carbon atoms, x is an integer between 30 and 100, and y is an integer between about 5 and about 20, with the proviso that the acid number of the siloxane be between about 50 and about 300.

Illustrative of R is any monovalent hydrocarbon radical, such as alkyl (such as methyl, ethyl, n-pentyl, n-dodecyl, n-octadecyl, 2-ethyl-n-hexyl); cycloalkyl (such as cyclobutyl, cyclopentyl, cyclohexyl, and the like); aryl (such as phenyl, naphthyl, biphenyl, and the like); alkenyl (such as vinyl, alkyl, methallyl, 3-butenyl, and the like); alkaryl (such as tolyl, xylyl, 2,4-diethyl-phenyl, 4-dodecylphenyl, and the like); aralkyl (such as phenylethyl, and the like).

Illustrative of R' is an alkylene group, such as ethylene, isopropylene, octadecylene, 2,2,4-trimethylpentylene; cycloalkylene groups such as cyclopropylene, cyclobutylene, cyclooctylene, 1-methyl-2-ethylcyclohexylene, and the like; or an aralkyl group such as, beta-phenylethylene, and the like. Typical examples of these carboxyalkylsiloxanes are:

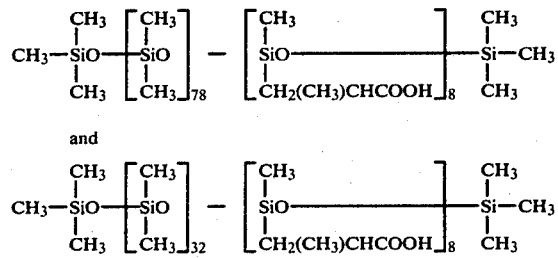

The aliphatic glyoximes useful in this invention have the formula:

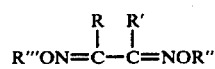

wherein R and R' are the same or different alkyl or alkoxy groups containing between 1 and about 20 carbon atoms per group, and wherein R" and R'" are hydrogen or alkyl radical containing between 1 and about 15 carbon atoms per group. Typical glyoximes of the invention include dimethyl glyoxime, diethyl glyoxime, dipropyl glyoxime, dibutyl glyoxime, dipentyl glyoxime, and dilauryl glyoxime.

The aryl modified aliphatic quanternary ammonium salts of this invention contain between about 15 and about 50 carbon atoms per molecule. Typical salts of the invention include phenyl stearyl trimethyl ammonium chloride, phenyl stearyl lauryl dimethyl ammonium chloride and diphenyl stearyl dimethyl ammonium chloride.

The internal release additives of the invention can be premixed with the polyisocyanate or with the active hydrogen containing (polyol) component or they can be added separately to the reaction mixture. However, it is customary practice to pre-mix the catalyst and blowing agent (if used) and other ingredients except the polyisocyanate with the polyol and to package, sell and ship such pre-mixes to the polyurethane molder. It is therefore preferred to pre-mix the release agents with the active hydrogen (polyol) component.

This invention is applicable to any of the systems for making polyurethane elastomers, either solid or microcellular, known to those skilled in the art. It is of particular importance in making solid or microcellular polyether polyurethane elastomers by forming a reaction mixture consisting essentially of:

(a) a polyol (preferably a polymer polyol comprising a major amount of a normally liquid polyoxy alkylene polyol that has a molecular weight of at least 1500 and a hydroxyl number from 20 to 120 and that contains therein a minor amount of a film forming organic polymer having a molecular weight of at least 5000), (b) an organic polyisocyanate in an amount that provides from 0.8 to 1.3 (preferably from 0.95 to 1.1) isocyanato groups per active-hydrogen in the reaction mixture, (c) a catalytic amount of catalyst or catalysts for curing of the reaction mixture to produce the elastomer. Tertiary amine catalysts are preferably used in the amounts between about 0.1 and 0.15 p.p.h.p. and organo-tin catalysts are preferably used in amounts of about 0.2 p.p.h.p. and, (d) a mold release additive that is selected from the group consisting of:

(I) carboxyalkylsiloxanes of the formula:

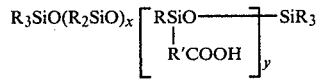

wherein R is a monovalent hydrocarbon radical, R' is a divalent hydrocarbon radical containing up to 18 carbon atoms which separates the carboxy group from the silicon atom by at least two carbon atoms, x is an integer between 30 and 100, and y is an integer between 5 and 20, with the proviso that the acid number of the siloxane be between about 50 and about 300, (II) an aliphatic glyoxime of the formula:

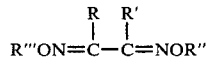

wherein R and R' are the same or different alkyl or alkoxy groups containing between 1 and about 20 carbon atoms per group, and wherein R" and R''' are hydrogen or alkyl radical containing between 1 and about 15 carbon atoms per group, and (III) an aryl modified aliphatic quanternary ammonium salt containing between about 15 and about 50 carbon atoms per molecule, said reaction mixture containing from 97 to 65 parts by weight of (a) and from 3 to 35 parts by weight of (b) per hundred parts by weight of (a) an (b) and said reaction mixture containing (d) in an amount effective to impart to said elastomer the property of self-release from the walls of said mold cavity. The reaction mixture is then cured to produce the elastomer.

If it is desired to produce a microcellular product, then there is also employed:

(e) a blowing agent in an amount sufficient to produce a microcellular structure in the elastomer.

In a preferred embodiment, the reaction mixture employed in this invention also contains:

(f) an aromatic glycol, and the reaction mixture contains from 1 to 35 (preferably from 1 to 20) parts by weight of (f) per 100 parts by weight of (a) and (f).

If it is desired to form a polyurethane-polyurea elastomer, then the reaction mixture employed in this invention also contains:

(g) an aromatic polyamine having at least two primary amine groups attached to carbon atoms of the same or different aromatic rings, at least one of such carbon atoms having a substituent other than hydrogen, and the reaction mixture contains from 0 to 35 (preferably from 3 to 15) parts by weight of (g) per 100 parts by weight of (a) and (b).

As will be apparent to those skilled in the art, a specific formulation or reaction mixture for an elastomer cannot be described which would answer each and every application requirement. Rather, consideration must be given to the specifications necessary for satisfactory performance under a given set of conditions. The skilled worker, therefore, is able to select the formulation that best satisfies the particular application requirement and may add the release agent according to this invention. For example, the particular operating temperature range, the final forces and deflections allowed during the impact cycle, cost requirements, processing requirements, etc., must be considered for each case.

The polymer polyols employed in the preferred embodiment of this invention have a normally liquid polyol component that has a molecular weight of at least 1500 (preferably from 2000 to 8400) and that has a hydroxyl number from 20 to 120 (preferably from 25 to 50). The polymer polyol also has a polymer component that has a molecular weight of at least 5000. The polymer component is dissolved or dispersed in the polyol component. The polymer polyol preferably contains from 85 to 60 parts by weight of the polyol and from 15 to 40 parts by weight of the polymer per 100 parts by weight of the polymer polyol. In the process of this invention, these polymer polyols react with the organic polyisocyanate to produce urethane groups. Polyols of the polymer polyol type which may be used in the formulations of this invention impart higher modulus to the elastomer than conventional polyols. Further, the polymer polyols are desired because of the modulus insensitivity to temperature of the elastomer produced therefrom. Suitable polymer polyols are disclosed in U.S. Pat. Nos. 3,304,273; 3,383,351 and 3,523,093; Belgian Patent No. 788,115; Canadian Patent No. 785,835, and Kuryla et al, "Polymer/Polyols, A New Class of Polyurethane Intermediates," J. Cellular Plastics, March 1966.

The polymers in the polyols employed in the process of this invention include those produced from monomers such as hydrocarbon olefins (e.g., styrene, chlorostyrene), olefinic nitriles (e.g., acrylonitrile, methacrylonitrile), alkenyl esters of alkanoic acids (e.g., vinyl acetate, vinyl propionate, vinyl butyrate), alkyl acrylates (e.g., methyl acrylate and ethyl acrylate), alkyl methacrylates (e.g., methylmethacrylate and ethylmethacrylate), unsaturated aliphatic acids (e.g., acrylic acid and methacrylic acid). The preferred olefin is acrylonitrile alone or mixed with styrene. Preferably, the polymer component is formed in situ by polymerizing one or more polymerizable monomers in the polyol.

The polyol employed in the process of this invention is a polyether polyol, a polyhydroxyalkane, a polyphenol, a polyoxyalkylene polyol, or the like. Among the polyols which can be employed are one or more polyols from the following classes of compositions, alone or in admixture, known to those skilled in the polyurethane art.

(a) Alkylene oxide adducts of polyhydroxyalkanes;
(b) Alkylene oxide adducts of non-reducing sugars and sugar derivatives;
(c) Alkylene oxide adducts of polyphenols;
(e) The polyols from natural oils such as castor oil, and the like.

Illustrative alkylene oxide adducts include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1,-trimethylolethane, 1,1,1-trimethylolpropane, pentaerythritol, caprolactone, polycaprolactone, xylitol, arabitol, sorbitol, mannitol, and the like; preferably the adducts of ethylene oxide, propylene oxide, apoxybutane, or mixtures thereof. A preferred class of alkylene oxide adducts of polyhydroxyalkanes are the ethylene oxide, propylene oxide, butylene oxide, or mixtures thereof, adducts of trihydroxyalkanes. Ethylene oxide capped ($—OC_2H_4OH$ terminated) propylene oxide polyols are preferred because of their increased reactivity over non-capped propylene oxide polyols thus leading to decreased demold times for the molded article.

Blends of polyols described above and polymer polyols described can be used as the active hydrogen component as desired. Alternatively, the polyols described above can be used without the polymer as the active hydrogen component. Broadly, the active hydrogen component of the compositions of this invention is free of polyesters of polycarboxylic acids or anhydrides.

The aromatic polyamines which can be employed when desired in this invention contain at least two primary amino groups attached to carbon atoms of the same or different aromatic rings, at least one of such carbon atoms being adjacent to a carbon atom having a substituent other than hydrogen (i.e., at least one of the primary amino groups is "hindered"). As used herein, "polyamine" denotes a monomer or polymer containing a plurality of amino groups and does not necessarily denote a polymer of a monomeric amine. In the process of this invention, these polyamines react with the organic polyisocyanate to produce urea groups and function as chain extenders. Aromatic polyamines are used as extenders in the process of this invention because they impart high load bearing ability and modulus insensitivity to temperature to the resulting elastomer. Illustrative of suitable hindered aromatic polyamines are 3chloro-4,4'-diaminodiphenylmethane, 4,4'-methylene bis(2-chloroaniline), cumene diamine, toluene diamine, dichlorobenzidine, etc.

The organic polyisocyanates employed in this invention include monomeric and polymeric organic polyisocyanates, aliphatic and aromatic polyisocyanates and prepolymers produced by reacting a polyol with an excess of a polyisocyanate. The preferred polyisocyanates are quasiprepolymers (especially the reaction products of excess tolylene diisocyanate and short chain polyoxypropylene diols or triols, e.g., those having 2 to 4 oxypropylene groups) because of the ease of processing such materials.

A wide variety of polyisocyanates can be used as such or as prepolymers formed by reaction with polyols as indicated above. Suitable polyisocyanates for use in the process of this invention include poly(arylene-isocyanates) having at least two aromatic rings with one isocyanato group on each ring. These aromatic rings are suitably inter-connected by an ether, sulfone, sulfoxide, methylene, propylene, carbonyl linkage or by two methylene groups connected to a benzene ring substituted by an isocyanato group. The aromatic rings of the poly(arylene-isocyanate) can be substituted, e.g., by methyl, ethyl or propyl groups. Suitable poly(arylene-isocyanates) include polymethylene poly(phenyleneisocyanates) having the formula:

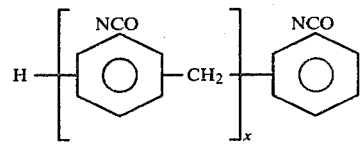

wherein x has an average value from 1.1 to 5 inclusive (preferably from 2.0 to 3.0). Other suitable polyisocyanates include 4,4'-diphenylmethylene diisocyanate; 3,3'-diphenylmethylene diisocyanate; diphenyl diisocyanate; diphenylsulfone diisocyanate; diphenylsulfide diisocyanate; diphenylsulfoxide diisocyanate; and diphenylpropane diisocyanate; and the isomeric tolylene and xylene diisocyanates and their residue products.

The aromatic glycols which can be employed when desired in this invention include reaction products of alkylene oxides with aromatic amines or alcohols having two active hydrogens, especially reaction products of alkylene oxides with di[hydroxyalkoxy]aryl compounds and primary amino aryl compounds. In the process of this invention, the aromatic glycols react with the organic polyisocyanates to form urethane groups and function as chain extenders. The preferred aromatic glycols are the reaction products of ethylene oxide aniline. Others may be used such as an ethylene oxide and propylene oxide adducts of bisphenol A ("PLURACOL-P-245") or the propylene oxide adducts of aniline ("C-100").

The catalysts employed in the process of this invention accelerate the cure of the reaction mixture and include organic amines and organometallic compounds such as lead octoate, dibutyltin dilaurate, tin octoate, cobalt octoate and triethylene diamine.

The blowing agents employed in the process of this invention include any compound capable of generating an inert gas under the conditions used to cure the elastomer (e.g., by reaction to produce a gas or by volatilization). Suitable blowing agents include volatile halocarbons (especially chlorocarbons and chlorofluorocarbons) such as methylene chloride, trichloromonofluoromethane, dichlorofluoromethane, dichloromonofluoromethane, dichloromethane, trichloromethane, bromotrifluoromethane, chlorodifluoromethane, chloromethane, 1,1-dichloro-1,1-fluoromethane, 1,1-difluoro-1,2,2-trichloroethane, chloropentafluoroethane, 1-chloro-1-fluoroethane, 1-chloro-2-fluoroethane, 1,1,2-trifluoroethane, 2-chloro-1,1,2,3,4,4-nonofluorobutane, hexafluorocyclobutane and octafluorobutane. Other useful blowing agents include low-boiling hydrocarbons such as butane, pentane, hexane, cyclohexane and the like. The amount of the blowing agent employed is determined by the desired elements of the cellular elastomer to be produced. In this connection, the elastomers produced by the process of this invention can be designed to have any of a wide range of densities, e.g., from 5 to 70 pounds per cubic foot. For certain applications, e.g., for automobile bumpers, the elastomers preferably have densities from 10 to 40 and such densities can be achieved by employing from 3 to 10 parts by weight of a blowing agent (such as methylene dichloride or trichloromonofluoromethane) per 100 parts by weight of the active hydrogen-containing components and the polyisocyanate in the reaction mixture.

In this invention, the reaction mixture can be formed and cured in accordance with the standard techniques known in the art. Thus, in those cases where molded microcellular elastomers are to be produced, the techniques described in Dunleavy, "Some Aspects of the Microcellular Urethane Material and Process," J. Elastoplastics, 2, January 1970, are applicable.

This invention is particularly well suited for use in Reaction Injection Molding (RIM) systems utilizing a liquid polyether polyol and liquid polyisocyanates. RIM systems are schematically illustrated as follows:

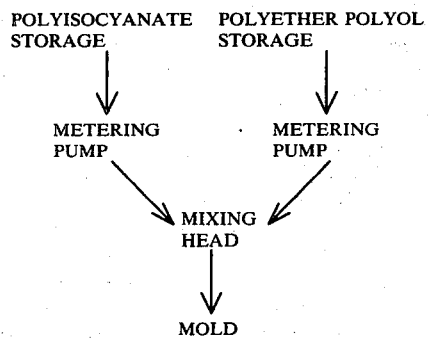

Suitable RIM systems are described in two Kunstoffe articles appearing in Volume 61 August 1971, Pages 540–544 and September 1971, Pages 639–645. The disclosures of both of these are incorporated herein by reference.

In the mixing head, metered amounts of polyisocyanate and polyether polyol (in appropriate relative amounts for producing the desired polyurethane) are instantly intimately mixed by impingement-of-one against the other in a mixing chamber in the mixing head. Other additives such as catalyst, blowing agent, and internal mold release agent, as well as additional active hydrogen component, are pre-mixed with the polyether polyol (or the polyisocyanate, if desired) before it is metered and pumped to the mixing head. The two liquid reactant streams are pressurized and forced against each other upon entering the mixing chamber so that an intimate mixture immediately results. Impingement mixing of the type described above requires only a few seconds of time, for example, of the order of 4 to 10 seconds. The resulting mixture is then introduced into the mold while recirculating the two reactant streams back to their respective pumps. The entire cycle through the molding stage and ejection from the mold can consume only a few minutes, for example, from 1 to 4 minutes. If full utilization of the molds if desired, there is substantially no time available for cleaning the mold surfaces and treating same with an external mold release. The self-release compositions of this invention are fully suitable for use in impingement mixing RIM systems and are compatible with the requirements of such systems. Furthermore, the molded products resulting from the use of the compositions of this invention require no subsequent treatments to render them suitable for painting or other finishing operations and can be painted or otherwise finished directly upon removal from the mold. Since the polyurethane-forming and polyurea-forming reactions involved in the cure of the reaction mixtures are exothermic, curing can usually be accomplished without the application of heat from an external source in those cases where polyurea-forming components are used.

In the practice of this invention, one or more of each of the starting materials can be employed. In fact, it is often preferable to employ more than one of at least some of the starting materials, particularly the organic polyisocyanate (i.e., mixtures of isomeric tolylene diisocyanates) and catalyst (i.e., both tin and amine catalysts).

The microcellular elastomers produced in accordance with preferred embodiments of this invention are useful as energy absorbing components in automobile bumpers, packaging and the like.

The molecular weights of the polyols and polymer polyols described herein are weight average molecular weights.

EXAMPLES

The following examples illustrate the present invention. All parts and percentages are on a weight basis unless otherwise specified.

| Abbreviation | Meaning |
| --- | --- |
| p.p.h.p. | Weight parts per hundred weight parts of polyol. |
| EW (Equivalent Weight) | A unit basis for calculation of reactant weight ratios. It is the weight of a substance that theoretically combines with one gram of hydrogen or eight grams of oxygen, i.e., EW(Hydrogen=1) and EW(Oxygen=8). |
| Polyol A | A polyalkylene oxide triol produced from propylene and ethylene oxides and glycerine and having a molecular weight of about 3000 and an equivalent weight of 1000. The alkylene oxide nitrile are present primarily in blocks and the primary OH content is about 75 mol %. The ethylene oxide is used to "cap" the triol. Based on its alkylene oxide content this triol contains 85 wt. % $C_3H_6O$ and 15 wt. % $C_2H_4O$. |
| Polymer/Polyol I | A polymer/polyol having EW= 2000 and produced by polymerizing 20 wt. % acrylonitrile in 80 wt. % Polyol A. The polymer in this polymer/ |

| Abbreviation | Meaning |
|---|---|
| | polyol has a molecular weight of about 6000. |
| Aromatic Diol I | Reaction product of 1 mol of aniline and 2.4 mols of ethylene oxide having the formula: $N[(CH_2CH_2O)_{1.2}H]_2$ 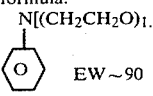 EW~90 |
| Polyol Blend I | A mixture of 87 wt. parts of Polymer/Polyol I, 6.5 wt. parts of Aromatic Diol I, 6.5 wt. parts of ethylene glycol. |
| Polyol Blend II | A mixture of 82 wt. parts of Polymer/Polyol I, 9 wt. parts of Aromatic Diol I, 9 wt. parts of ethylene glycol. |
| Catalyst Blend I | A blend of 100 wt. parts of DABCO 33 LV and 1.65 wt. parts DBTD. |
| DABCO 33LV | 33% triethylene diamine, 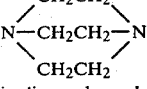 in dipropylene glycol. |
| DBTD | dibutyltin dilaurate. |
| Isocyanate A | This is a quasi-prepolymer containing 30.8 wt. % free NCO produced by reacting (a) an excess of a mixture containing 80 wt. % 2, 5-tolylene diisocyanate and 20 wt. % 2,6-tolylene diisocyanate with (b) a polyol produced by reacting glycerine and propylene oxide and having a hudroxyl number of 633. Also referred to herein as TDI formulation. |
| Isocyanate B | This is a quasi-prepolymer containing 29 wt. % free NCO comprised of 4-4'-diisocyanato diphenyl methane. Also referred to herein as MDI formulation. |
| Fatty Acid I (Carboxylic Acid 1) | A fatty acid mixture with an acid number of 23.5, obtained from Central Soya Corporation ("Actiflo 68 UB"). |
| Fatty Acid II (Carboxylic Acid 2) | A phosphate with an acid number of 282, obtained from E. I. Du Pont de Nemours & Co. ("ELA"). |
| Fatty Acid/Salt I | A salt formed from equimolar amounts of oleic acid and dibutyl amine, obtained from E. I. Du Pont de Nemours & Co. ("Barak"). |
| Telomer I (Carboxylic Acid 3) | A mixture of: (1) 50% of a synthetic fatty acid having a molecular weight of 587 and an acid number of 95.6; (2) 35% methylester of the fatty acid; and, (3) 15% polyethlene oligomer. |
| Telomer II (Carboxylic Acid 4) | A mixture of: (1) 50% of a synthetic fatty acid having a molecular weight of 755 and on acid number of 72.4; (2) 35% methyl ester of the fatty acid; and, (3) 15% polyethylene. |
| Telomer III (Carboxylic Acid 5) | A mixture of: (1) 50% of a synthetic fatty acid having a molecular weight of 836 and an acid number of 67.1; (2) 35% methyl ester of the fatty acid; |

| Abbreviation | Meaning |
|---|---|
| | and (3) 15% polyethylene oligomer. |
| Hydroxyl Number (OH No.) | A measure of the equivalent weight of a hydroxyl-containing substance. OH No. = $\frac{56.1 \times 1000}{EW}$ Expressed as milligrams of potassium hydroxide per gram of material. |

Test Methods for Evaluating Release Properties

Test Method I—Initial Release Forces and Travel

Prior to weighing and mixing of the polyurethane-forming components, aluminum loaf pans measuring $8\frac{1}{2}'' \times 4\frac{1}{2}'' \times 2\frac{1}{2}''$ were sprayed with a silicone release agent so as to coat the inside surface of each pan. The substrate upon which the urethane-forming mixture was to be poured was cleaned as described hereinafter and dried by wiping with a clean cheese cloth. The substrate measured $3'' \times 5'' \times 0.025''$ for the aluminum panels (3003 H14 obtained from Q Panel Company) and $3'' \times 5'' \times 0.015''$ for the nickel plated steel (American Nickeloid Corporation). A $\frac{3}{4}''$ Scotch brand transparent tape (MMM Co.) was then applied to one edge of the metal substrate so that the exposed area remaining on each substrate was approximately 4" in length and always 3" in width. It was determined previously that the urethane would not adhere to the non-adhesive side of the Scotch brand transparent tape, thereby providing a "lip" for testing purposes as will be described later. The metal substrate was then placed in the baking pan so that the surface desired to be in contact with the urethane faced upwardly and was not in contact with the silicone release agent applied to the baking pan. The baking pan containing the metal substrate was then placed in an oven set at 150° F.

The polyol blend was weighed in a plastic coated cup. In a separate cup, the isocyanate component was weighed in an amount in excess of that needed to react with the polyol. The cup of polyol blend was then placed on a balance and the balance was set to a weight corresponding to the quantity of the isocyanate component desired to be mixed with the polyol blend. The isocyanate component was then rapidly poured into the polyol blend, followed by mixing of the ingredients. The mixed components were then poured upon the metal substrate located in an oven at 150° F. After a three-minute waiting period, the baking pan containing the cured urethane, in intimate contact with the metal substrate, was removed from the oven. The resulting polyurethane overflowed the metal substrate in the pan. However, the silicone release agent that had previously been applied to the baking pan served to release the polyurethane with the metal substrate attached. The excess cured polyurethane was then cut off with a knife blade so that the edges of the metal substrate were exposed.

By lifting the cured polyurethane off of the Scotch brand tape that was attached to the metal substrate, a "lip" of cured polyurethane resulted. The metal substrate "lip" was that portion of the substrate that had the Scotch brand tape adhered to it. Thus, the "lips" were attached to the jaws of an Instron tester and the amount of release force needed to pull the cured polyurethane from the metal substrate was measured.

The Instron jaw separation speeds were set at 20 in/min while the chart speed was set at 10 in/min. The release forces were recorded on the traveling chart along with the distance of travel of the cured polyurethane coming off of the metal substrate. Both the minimum and maximum force values were determined and are presented in the tables given hereinbelow. Distance of travel was recorded and is related to the ease of removing the cured polyurethane from the metal substrate. For example, at relatively high release forces, the cured polyurethane released from the metal substrate over an approximate distance of 4 inches (the length of the metal adhered to the polyurethane). The distance was approximate in that, at times, when preparing the specimen for testing on the Instron, the point at which the jaws were attached varied slightly and in some cases may have been beyond the area covered by the Scotch brand tape on the metal substrate. In the case of a specimen exhibiting relatively low release values, during the stripping of the cured polyurethane from the metal, there were areas where the polyurethane released so quickly and over such a short distance of travel that it was beyond measurement by the Instron. The values recorded in this case were those where some adherence, although slight, had occurred. The procedure was used in developing release forces and travels in Examples 1-18, 20-28, and 34-40.

Cleaning of Metal Substrates

The metal substrates that the polyurethanes were poured upon had to be cleaned so that there was confidence that all oil or grease (e.g., fingerprints) had been removed. Therefore, the following cleaning procedure was employed in every case.

Aluminum Substrates

Cleaning Method A

The aluminum panel was first degreased by immersing in a 50/50 by volume toluene/perchloroethylene solvent for approximately 10 minutes. The substrate was then removed and allowed to air dry at room temperature. A bath, previously prepared by dissolving 10 KOH pellets in 500 cc of cool tap water, was employed as a final degreasing step. The substrates were placed in the KOH bath for approximately 5 minutes followed by rinsing in hot tap water. They were then wiped dry using a clean, dry cheese cloth, taking precautions to avoid fingerprints. Whereas, the aluminum substrate repelled water prior to cleaning, afterwards water readily wet the surface of the substrate. The KOH treatment of aluminum is known to etch the surface of aluminum in addition to its degreasing effect. It is considered a severe cleaning treatment for aluminum.

Cleaning Method B

A relatively milder cleaning treatment for the aluminum substrates was also utilized. Ivory Soap suds were used twice to wash the panels followed each time by rinsing in warm tap water. The panels were dried with a clean, dry cheese cloth. Prior to cleaning and after cleaning in this manner, the aluminum surface continued to repel water. It was considered a milder form of cleaning.

Nickel Plated Steel

The electroplated nickel steel panels were coated on one side only of the panels and were bright and smooth in appearance. The cleaning procedure involved immersing the panel in cellosolve acetate for approximately 15 minutes. The panels were then sprayed with cellosolve acetate and wiped dry using lintless cotton gauze. Prior to cleaning, the bright surface repelled water, whereas, after cleaning, water readily wet the surface.

Test Method II—Vertical Test Procedure

This test employs a cylindrical mold in conjunction with a mixing machine for the purpose of comparing commonly employed external release agents with the internal release agents of the present invention. The mixing machine consists of: (a) 2 positive displacement cylindrical pumps operated by a $\frac{3}{8}$" electric drill and (b) a mechanical, air-operated mixer that is run at 50 psi. The cylindrical pumps were used to eject specific amounts of the polyol blend and the isocyanate. The cylindrical mold utilized consists of two parts. When clamped together it is inserted under the spout of the mixing machine and filled with the RIM urethane. The top part consists of an inverted cylindrical steel container measuring $1\frac{3}{8}$" in diameter by $\frac{1}{4}$" in height. The walls of the container are approximately $\frac{1}{8}$" thick providing a circular opening at the bottom. The top portion of the inverted cylindrical container was drilled to provide an entrance port for the urethane and a vent for each measuring $\frac{3}{8}$" by 7/16" in elliptical diameters. The bottom opening is 1.128" in diameter. When the bottom opening is placed over a metal substrate simulating the surface of the mold, the cured urethane in contact with the metal substrate is 1 sq. in. of surface area. The lower part of the mold is designed to hold a metal plate measuring 3" by 5" with a thickness of 0.040-0.045". It is held in place so that the same 1 sq. in. of surface of the metal will be in contact with the cured urethane when the mold is clamped. The two-part mold is unique in that any substrate measuring 3" by 5" with a thickness of 0.040-0.045" can be inserted into the mold for testing purposes. Prior to the two-minute cycle simulating a production molding time, the clamped mold is transferred to an Instron, unclamped, and tested by exerting a vertical opposing force to separate the cured 1 sq. in. of urethane from the metal substrate. A crosshead speed of 10" per minute and a chart speed of 50" per minute has been arbitrarily selected for testing releases. The pen response of the instron was measured at 1.1 second to full scale deflection. Throughout the experiments a mold temperature of 150° F. was maintained and the same nickel-plated panel was utilized. Prior to the runs, initially, the panel was cleaned with cellosolve acetate.

EXAMPLE 1

This example illustrates the excellent mold release that is obtained when Fatty Acid I is employed in conjunction with Ivory Soap in the TDI formulation. Ivory Soap is essentially a sodium salt of fatty acids. In Example 1 excellent initial and multiple release are obtained where Fatty Acid I is employed at the 1% level and Ivory Soap comprises 0.24% by weight of total urethane.

In contrast to the excellent results that were obtained in Example 1 when Fatty Acid I was employed in conjunction with Ivory Soap, a formulation containing 1% of Fatty Acid I without Ivory Soap (Comparison B) had relatively high release forces after twelve multiple releases. This difference in mold release effectiveness which is noted when comparing Example I with Comparison B may be attributed to the presence of the sodium salt of fatty acids which provided for effective mold release in Example I.

Although Ivory Soap when used as the sole mold release additive provided effective mold release (Comparison C), this additive had a serious defect. The Ivory Soap accelerated the cure rate of the urethane when the catalyst blend was unadjusted. In order to moderate the cure rate using this additive, the amount of catalyst (catalyst Blend I) employed in the formulation was reduced in another comparison (Comparison D). In Comparison D effective mold release and a reduction in the cure rate were achieved, but this formulation resulated in excessive blowing of the urethane.

Test Method I was employed in Example I and in each of the comparisons. The results are presented in Table I which follows.

TABLE I

| Comparison/ Example | A | B | C[3] | D[4] | 1 |
|---|---|---|---|---|---|
| Polyol Blend I | 41 g. | 41 g. | 41 g. | 41 g. | 41 g. |
| Catalyst Blend I | 0.30 g. | 0.30 g. | 0.30 g. | 0.10 g. | 0.30 g. |
| Fatty Acid I | — | 0.61 g. | — | — | 0.61 g. |
| Dried Ivory Soap | — | — | 0.12 g. | 0.12 g. | 0.15 g. |
| Isocyanate A Prepolymer, Index | 1.05 | 1.05 | 1.05 | 1.05 | 1.05 |
| Initial Release Forces[2] and Travel | | | | | |
| Maximum, lbs./in. | 4.7 | — | 2.4 | 1.4 | — |
| Minimum, lbs./in. | 1.6 | — | 0.93 | 0.57 | — |
| Travel, in. | 3.2 | — | 2.0 | 1.3 | — |
| Release Forces After Twelve Multiple Releases[2] | | | | | |
| Maximum, lbs./in. | — | 4.6 | — | 2.2 | 0.27 |
| Minimum lbs./in. | — | 2.1 | — | 1.0 | 0.17 |
| Travel, in. | — | 3.2 | — | 2.2 | 0.7 |

[1]The Ivory Soap was added to the polyol blend.
[2]Test Method I
[3]Accelerated cure rate.

EXAMPLES 2-3

In these examples oleic acid (acid No. 200) was employed as an internal release additive together with Fatty Acid I (acid No. 23.5) in the TDI formulation. In order to overcome the anticipated cure interference caused by the presence of the fatty acid groups in the foam formulation, potassium, a known urethane cure accelerator, was introduced into the formulation in the form of a salt, potassium laurate. The potassium laurate was added in an amount sufficient to produce cure times for Examples 2 and 3 that were comparable to the cure time for a control formulation containing the same amount of catalyst (catalyst Blend I) but containing no internal release additive (Comparison E).

Example 2 shows the use of a 1% release additives package (Fatty Acid I, oleic acid and potassium laurate) by weight of total urethane. Example 3 shows the employment of the same internal release additives at a 2% level by weight of total urethane. At the 2% loading level of internal release additives (Example 3) excellent initial mold release is obtained, and the release forces remain very low even after the twelfth release from the nickel-plated steel substrate. The results are presented in Table II which follows.

TABLE II

| Comparison/ Example | 2 | 3 | E |
|---|---|---|---|
| Polyol Blend I | 41 g. | 41 g. | 41 g. |
| Catalyst Blend I | 0.30 g. | 0.30 g. | 0.30 g. |
| Fatty Acid I | 0.31 g. | 0.61 g. | — |

TABLE II-continued

| Comparison/ Example | 2 | 3 | E |
|---|---|---|---|
| Oleic Acid | 0.27 g. | 0.54 g. | — |
| Potassium Laurate[1] | 0.04 g. | 0.07 g. | — |
| Isocyanate A Prepolymer, Index | 1.05 | 1.05 | 1.05 |
| Initial Release Forces[2] and Travel | | | |
| Maximum, lbs./in. | 0.93 | 0.57 | 3.5 |
| Minimum, lbs/in. | 0.53 | 0.33 | 1.5 |
| Travel, in. | 1.9 | 1.3 | 2.9 |
| Release Forces After[2] Twelve Multiple Releases | | | |
| Maximum, lbs./in. | 1.5 | 0.70 | — |
| Minimum, lbs./in. | 0.57 | 0.37 | — |
| Travel, in. | 1.9 | 1.8 | — |

[1]14.8% potassium
[2]Procedure following Test Method I.

EXAMPLE 4

In co-pending application Ser. No. 536,956, now U.S. Pat. No. 4,024,088, Fatty Acid II (essentially didodecyl hydrogen phospate) is disclosed as an effective internal release additive. However, because of its relatively high acidity (Fatty Acid II has an acid No. of 282) there is interference with the cure rate of the urethane, and it is necessary to increase the amount of catalyst (catalyst Blend I) in order to overcome this interference.

In Example 4 the amount of catalyst employed in the urethane formulation is the same as that employed in comparison F. However, potassium laureate is added to the urethane formulation in an amount which provided for equivalent cure times for Example 4 and Comparison F. Note that the gel time for the urethane formulation in Example 4 is 20 seconds, whereas the gel time for the urethane in Comparison F is 18 seconds. For all urethane foam formulations, these values are about the same.

The initial release forces and the values for release force after twelve multiple releases in Example 4 are considered to be excellent. The results are given in Table III which follows.

TABLE III

| Comparison/ Example | 4 | F |
|---|---|---|
| Polyol Blend I | 41 g. | 41 g. |
| Catalyst Blend I | 0.30 g. | 0.30 g. |

TABLE III-continued

| Comparison/Example | 4 | F |
|---|---|---|
| Fatty Acid II | 0.27 g. | — |
| Potassium Laurate[1] | 0.34 g. | — |
| Isocyanate A Prepolymer, Index | 1.05 | 1.05 |
| Gel Time, seconds | 20 | 18 |
| Initial Release Forces[2] and Travel | | | steel substrate. On the other hand, Comparison G which contained no internal mold release additives was examined only after the initial release from the nickel-plated steel panel because experience has shown that release force values for more than one release would have been excessively high and beyond the limits of the Instron Tester.

The results are presented in Table IV which follows.

TABLE IV

| Comparison/Example | 5 | 6 | 7 | 8 | 9[3] | 10[4] | 11 | 12 | G[5] |
|---|---|---|---|---|---|---|---|---|---|
| Polyol Blend I | 41 g. | 41 g. | 41 g. | 41 g. | 41 g. | 41 g. | 41 g. | 41 g. | 41 g. |
| Catalyst Blend I | 0.30 g. | 0.30 g. | 0.30 g. | 0.30 g. | 0.30 g. | 0.30 g. | 0.30 g. | 0.30 g. | 0.30 g. |
| Oleic Acid | 0.12 g. | 0.11 g. | 0.10 g. | 0.09 g. | 0.07 g. | 0.07 g. | 0.06 g. | 0.61 | — |
| Potassium Laurate[1] | 0.49 g. | 0.50 g. | 0.51 g. | 0.52 g. | 0.54 g. | 0.54 g. | 0.55 g. | — | — |
| Isocyanate A prepolymer Index | 1.05 | 1.05 | 1.05 | 1.05 | 1.05 | 1.05 | 1.05 | 1.05 | 1.05 |
| Gel Time, Seconds | — | — | — | — | — | 21 | — | 33 | 18 |
| Oleic Acid in Total Urethane, % | 0.80 | 0.82 | 0.84 | 0.86 | 0.88 | 0.88 | 0.90 | 1.00 | — |
| Initial Release Forces and Travel[2] | | | | | | | | | |
| Maximum, lbs./in. | 0.20 | 0.33 | 0.23 | 0.50 | 0.48 | — | 0.97 | 0.90 | 3.47 |
| Minimum, lbs./in. | 0.13 | 0.13 | 0.07 | 1.17 | 0.30 | — | 0.30 | 0.53 | 1.37 |
| Travel, in. | 0.7 | 0.8 | 0.5 | 0.7 | 1.35 | — | 1.8 | 2.1 | 3.3 |
| Release Forces After 12 Multiple Releases[2] | | | | | | | | | |
| Maximum, lbs./in. | — | — | — | — | 0.60 | 0.80 | — | — | — |
| Minimum, lbs./in. | — | — | — | — | 0.30 | 0.37 | — | — | — |
| Travel, in. | — | — | — | — | 1.0 | 1.0 | — | — | — |
| Thirteenth Release After 24-Hr. Delay[2] | | | | | | | | | |
| Maximum, lbs./in. | — | — | — | — | — | 0.53 | — | — | — |
| Minimum, lbs./in. | — | — | — | — | — | 0.40 | — | — | — |
| Travel, in. | — | — | — | — | — | 1.4 | — | — | — |

[1]14.7% Potassium
[2]Procedure following Test Method I.
[3]These values are the average of 2 runs.
[4]These values are the average of 2 runs.
[5]These values are the average of 7 runs.

| | | | |
|---|---|---|---|
| Maximum, lbs./in. | Manual Release was without effort | 2.7 | This formulation was difficult to manually remove from metal substrate |
| Minimum, lbs./in. | | 1.1 | |
| Travel, in. | | 2.9 | |
| Release Forces After[2] Twelve Multiple Releases | | | |
| Maximum, lbs./in. | 0.47 | — | |
| Minimum, lbs./in. | 0.3 | — | |
| Travel, in. | 0.9 | — | |

[1]14.8% Potassium
[2]Procedure following Test Method I.

EXAMPLES 5–12

In these examples oleic acid and potassium laurate were added separately to each polyol (Polyol Blend I) prior to adding the isocyanate. In one exception (Example 10) the oleic acid and potassium laurate were premixed prior to incorporation into the polyol. In these examples the amount of oleic acid and potassium laurate was varied in order to achieve a cure rate for the urethane that was comparable to that of Comparison G. In example 10, wherein 0.88% oleic acid and 0.12% potassium laurate by weight of total urethane were employed, a gel time of 21 seconds was achieved. This gel time was comparable to that provided by Comparison G (18 seconds). Example 10 provided excellent values for initial and multiple release from the nickel-plated

EXAMPLES 13–17

In these examples an oleic acid/sodium oleate mixture and an acetic acid/sodium oleate mixture are examined to determine their effectiveness as mold release additives in the TDI formulation. The oleic acid/sodium oleate mixture was prepared by reacting oleic acid with sodium carbonate, and the acetic acid/sodium oleate mixture was prepared by reacting acetic acid with sodium carbonate. The quantities of each additive were adjusted in order to obtain cure rates for the urethanes that compared favorably with the cure rate of the control formulation (Comparison H, containing no mold release additive).

In each example, the internal release additives were incorporated into the urethane at a total level of 1% by weight of the urethane formulation. As is noted in Examples 14, 15, and 17, the oleic acid/sodium oleate mixture provides an effective mold release additive for the TDI formulation. In contrast, the acetic acid/sodium oleate mixture was relatively ineffective as a mold release additive. In fact, the acetic acid/sodium oleate additive of Example 13 provided less effective release than the control formulation, Comparison H, which contained no internal release additive. On the basis of these results, it would be expected that the effectiveness of the fatty acid mold release additive would be increased by increasing the carbon chain length in the fatty acid.

The results are presented in Table V which follows.

TABLE V

| Comparison/Example | | 13 | 14 | 15 | 16 | 17 | H |
|---|---|---|---|---|---|---|---|
| Polyol Blend I | | 41 g. | 41 g. | 41 g. | 41 g. | 41 g. | 41 g. |
| Catalyst Blend I | | 0.30 g. | 0.30 g. | 0.30 g. | 0.30 g. | 0.30 g. | 0.30 g. |
| Acetic Acid / Sodium Carbonate | Reaction Product[1] | 0.61 g. | — | — | — | — | — |
| Oleic Acid / Sodium Carbonate | Reaction Product[2] | — | 0.61 g. | — | — | — | — |
| Oleic Acid / Sodium Carbonate | Reaction Product[3] | — | — | 0.61 g. | — | — | — |
| Acetic Acid / Sodium Oleate | Mixture[4] | — | — | — | 0.61 g. | — | — |
| Oleic Acid / Sodium Oleate | Mixture[5] | — | — | — | — | 0.61 g. | — |
| Isocyanate A Prepolymer, Index | | 1.05 | 1.05 | 1.05 | 1.05 | 1.05 | 1.05 |
| Gel Time, Seconds | | 19 | 21 | — | — | — | 17 |
| Tack Free Time, Seconds | | — | — | 26 | 25 | 25 | 25 |
| Initial Release Forces and Travel | | | | | | | |
| Maximum, lbs/in | | 11.4 | — | 0.40 | 4.03 | 0.27 | 3.97 |
| Minimum, lbs/in | | 3.1 | — | 0.27 | 1.77 | 0.17 | 1.33 |
| Travel, in | | 3.2 | — | 0.7 | 2.6 | 0.7 | 3.4 |
| Release Forces After 12 Multiple Releases | | | | | | | |
| Maximum, lbs/in | | — | 0.37 | — | — | — | — |
| Minimum, lbs/in | | — | 0.23 | — | — | — | — |
| Travel, in | | — | 0.8 | — | — | — | — |

[1]100 wt. parts of acetic acid, 12.83 wt. parts sodium carbonate
[2]100 wt. parts of oleic acid, 2.74 wt. parts of sodium carbonate
[3]100 wt. parts of oleic acid, 2.88 wt. parts of sodium carbonate
[4]100 wt. parts of acetic acid, 96.37 wt. parts of sodium oleate
[5]100 wt. parts of oleic acid, 18.34 wt. parts of sodium oleate

EXAMPLE 18

In this example a fatty acid amine salt (Fatty Acid/Salt I) was examined at the 1% level based on total urethane in the TDI formulation. Fatty Acid/Salt I is a commercial salt containing equimolar quantities of oleic acid and dibutyl amine. When Fatty Acid/Salt I was employed as the sole release additive in the urethane preparation (Comparison I), there was only a slight reduction in initial release forces as compared to the control formulation containing no internal release additive (Comparison I). However, the incorporation of Fatty Acid/Salt I together with Ivory Beads (essentially sodium soap) in a 1% by weight mixture based on total urethane (Example 18) resulted in excellent initial release and low release forces after twelve multiple releases from the nickel-plated steel substrate.

The results are presented in Table VI which follows.

TABLE VI

| Comparison/Example | I | 18 | J |
|---|---|---|---|
| Polyol Blend I | 41 g. | 41 g. | 41 g. |
| Catalyst Blend I | 0.30 g. | 0.30 g. | 0.30 g. |
| Fatty Acid/Salt I | 0.61 g. | 0.55 g. | — |
| Dried Ivory Beads[1] | — | 0.06 g. | — |
| Isocyanate A Prepolymer, Index | 1.05 | 1.05 | 1.05 |
| Gel Time, Seconds | Not measured but slow visually | 18 | 18 |
| Initial Release[2] Forces and Travel | | | |
| Maximum, lbs/in | 1.37 | Easy release when tested manually | 2.27 |
| Minimum, lbs/in | 0.37 | | 0.80 |
| Travel, in | 1.9 | | 2.8 |
| Release Forces After[2] 12 Multiple Releases | | | |
| Maximum, lbs/in | 2.97 | 0.17 | — |
| Minimum, lbs/in | 0.93 | 0.03 | — |
| Travel, in | 3.6 | 0.8 | — |

[1]8.9% sodium
[2]Procedure following Test Method I

EXAMPLE 19

In contrast to the previous examples that employed the low-catalyzed TDI formulation of this invention wherein manual mixing techniques were used, this example provides for the use of the highly-catalyzed TDI formulation whereby mixing is obtained using the laboratory mechanical mixer. The mold utilized was circular and was designed such that successive urethane formulations could be cured on a circular nickel-plated steel mold having one square inch of surface area.

Table VII presents values (psi) for the release forces obtained after each successive molding cycle at mold temperatures of 150° F. and 170° F. using the procedure described in Test Method II. In evaluating the release forces obtained after each successive mold release, it is to be noted that the initial release value that is obtained when an external release agent (P5CL) is employed is 61 psi. In comparison, the average value obtained using the mold release additives of Example 19 (oleic acid/potassium laurate mixture in an amount of 1% by weight of the urethane) was 60 psi for ten releases at a mold temperature of 170° F. and 75 psi for twelve releases at a mold temperature of 150° F. These values for multiple release forces using the oleic acid/potassium laurate additive at 150° F. and 170° F. are comparable to the initial release force obtained when the external release additive (P5CL) is employed in view of the standard deviations of the average release values for each formulation.

The results are given in Table VII which follows.

TABLE VII

| Comparison/Example | 19 | | |
|---|---|---|---|
| Polyol Blend I | 100 g. | | |
| Catalyst Blend I | 6.3 g. | | |
| Oleic Acid | } 1% Based on Acid) Total Urethane | 14.2 g. (88% Oleic | |
| Potassium Laurate[1] | | | |
| Isocyanate A Prepolymer, Index | 1.05 | | |
| Multiple Release Forces[2] | | | |
| From 1 sq. in. Circular Mold | | | |
| Using Vertical Test | | | |

| Release | psi, Mold Temp. 150° F. | psi, Mold Temp. 170° F. | |
|---|---|---|---|
| Initial | 66 | 45 | |
| 2nd | 66 | 64 | Note: Initial |
| 3rd | 86 | 66 | release value |
| 4th | 66 | 2 | for external |
| 5th | 68 | 66 | release agent |
| 6th | 70 | 58 | P5CL is 61 psi. |
| 7th | 74 | 58 | |
| 8th | 74 | 48 | |
| 9th | 86 | 58 | |
| 10th | 80 | 66 | |
| 11th | 90 | — | |
| 11th | 90 | — | |
| 12th | 70 | — | |
| Mean Release Value, psi | 75 | 60 | |
| Standard Deviation, psi | ±9 | ±6 | |

[1]14.8% Potassium
[2]Procedure following Test Method II

EXAMPLES 20-23

In these examples oleic acid and two fatty acid telomers, Telomer I and Telomer II, were each tested as internal release additives in the MDI formulation (Isocyanate B Prepolymer) using the procedure given in Test Method I. As is indicated in Example 23, oleic acid did not provide effective mold release from the MDI formulation (as compared to Example 12, wherein oleic acid provided a moderate initial release force value when employed as the sole internal release additive in the TDI formulation). Also, one of the fatty acid telomers (Telomer I, Example 21) was ineffective as a mold release additive as shown by the excessive release forces on initial release using Telomer I. In comparison, Telomer II (Example 22) exhibited low initial release forces when used in the MDI formulation. The difference in the two telomers is that Telomer I has a molecular weight of 587 (corresponding to an average chain of length of $C_{23}$, whereas Telomer II has a molecular weight of 775 (corresponding to an average chain length of $C_{30}$. These results demonstrate that a fatty acid containing a relatively long hydrocarbon chain is required for effective release in the MDI formulation.

The results are presented in Table VIII which follows.

TABLE VIII

| Comparison/Example | 20[2] | 21[2] | 22[2] | 23[2] |
|---|---|---|---|---|
| Polyol Blend II | 41 g. | 41 g. | 41 g. | 41 g. |
| Catalyst Blend I | 0.11 g. | 0.22 g. | 0.16 g. | 0.46 g. |
| Telomer I | — | 1.38 g. | — | — |
| Telomer II | — | — | 1.38 g. | — |
| Oleic Acid | — | — | — | 1.40 g. |
| Isocyanate B Prepolymer, Index | 1.02 | 1.02 | 1.02 | 1.02 |
| Initial Release[1] Forces and Travel | | | | |
| Maximum, lbs/in | Excessive Release Forces Unable to Record | Excessive Release Forces Unable to Record | 1.20 | Excessive Release Forces Unable to Record |
| Minimum, lbs/in | | | 0.53 | |
| Travel, in | | | 1.6 | |

[1]Procedure following Test Method I
[2]Catalyst levels adjusted to maintain comparable tack-free times.

EXAMPLES 24-28

These examples further demonstrate the excellent performance of long-chain fatty acids as mold release additives in the MDI formulation. In Examples 24-28 initial releases forces were measured for a synthetically prepared fatty acid, Telomer III, having an acid number of 67.1 and a molecular weight of 836. These examples show low initial release forces using Telomer III when only the amount of catalyst (Catalyst Blend I) in each formulation is varied following Test Method I. In contrast, Comparison K demonstrates that excessive release forces are obtained using Test Method I when no internal release additive is present in the MDI formulation.

The results are presented in Table IX which follows.

TABLE IX

| Comparison/Example | 24 | 25 | 26 | 27 | 28 | K |
|---|---|---|---|---|---|---|
| Polyol Blend II | 41 g. | 41 g. | 41 g. | 41 g. | 41 g. | 41 g. |
| Catalyst Blend I | 0.17 g. | 0.18 g. | 0.20 g. | 0.21 g. | 0.22 g. | 0.11 g. |
| Telomer III | 1.38 g. | 1.38 g. | 1.38 g. | 1.38 g. | 1.38 g. | — |
| Isocyanate B Prepolymer, Index | 1.02 | 1.02 | 1.02 | 1.02 | 1.02 | 1.02 |
| Initial Release Forces[1] and Travel | | | | | | |
| Maximum, lbs/in | 0.50 | 0.07 | 0.57 | 0.20 | 0.3 | Excessive Cohesive Failure Unable to Record Values. |
| Minimum, lbs/in | 0.17 | 0.07 | 0.20 | 0.17 | 0.2 | |
| Travel, in. | 1.1 | 0.5 | 0.7 | 0.7 | 0.7 | |

[1]Procedure following Test Method I

EXAMPLES 29-32

In these examples the effectiveness of two internal mold release additives, phenyl stearic acid and phenyl stearyl trimethyl ammonium chloride, is examined in the MDI formulation using Test Method II, employing the laboratory mixing machine in conjunction with the one square inch circular mold. Both the phenyl stearic acid and the phenyl stearyl trimethyl ammonium chloride performed as effective multiple release additives in the MDI formulation. However, the phenyl stearic acid required the use of additional tin catalyst loading in order to overcome the interference with the cure rate of the urethane which resulted from the presence of the fatty acid in the formulation. In contrast, the quarternary ammonium salt did not require an increased loading of catalyst.

It is to be noted that the mean release force value of each of the examples is less than the mean release value for each control, Comparisons L-N. In Comparisons L-N two commercially available external release agents ("XMR-114" in Comparisons L and M; "RD-435" in Comparison N) were employed in order to obtain comparative values for mold release force. These external release additives were applied to the nickel plated steel substrate after each molding cycle. Several problems were noted when working with the external release agents. First, the external release agents provided effective release for only one or two moldings, making frequent reapplication of the release agent necessary. Second, there was an irregular build-up on the mold surfaces which had to be periodically removed from the mold. Third, there was the possibility of surface contamination of the molded urethane article which might interfere with subsequent coating or painting operations. In contrast, the use of internal release additives makes it possible to avoid these problems.

The results are presented in Table X which follows:

TABLE X

Multiple Release Forces
From 1 sq. in. Circular
Mold Using Vertical Test[1]

| Comparison/Example | 29[2] | 30[2] | 31[3] | 32[4] | L[5] | M[j] | N[6] |
|---|---|---|---|---|---|---|---|
| Catalyst Blend in 100 wt. parts Polyol Blend II | (7) | (8) | (9) | (10) | (11) | (12) | (13) |
| Isocyanate B Prepolymer, Index | 1.02 | 1.02 | 1.02 | 1.02 | 1.02 | 1.02 | 1.02 |
| Tack Free Time, sec. | 8 | 10–12 | 35 | 13 | 13 | 13 | 13 |
| Number of Releases | 6 | 10 | 5 | 3 | 5 | 12 | 3 |
| Mean Release Value, psi | 3.1 | 2.1 | 3.1 | 2.9 | 4.4 | 4.5 | 5.4 |
| Range, psi | 2.7–4.0 | 1.4–4.6 | 1.8–5.8 | 2.3–3.4 | 4.0–4.9 | 1.8–6.7 | 3.7–7.9 |
| Standard Deviation, psi | 0.5 | 1.0 | 1.7 | 0.6 | 0.4 | 1.4 | 2.2 |

[1]Procedure following Test Method II
[2]Phenyl stearic acid, 1% of total urethane
[3]Phenyl stearic acid, .71% and Sodium phenyl stearate, .29% of Total Urethane
[4]Phenyl stearyl trimethylammonium chloride, 1.2% of total urethane
[5]External release agent, XMR-114
[6]External release agent, RD-435
[7]0.59 p.p.h.p. Dabco 33LV,3.62 p.p.h.p. DBTD
[8]0.59 p.p.h.p. Dabco 33LV,2.08 p.p.h.p. DBTD
[9]0.59 p.p.h.p. Dabco 33LV,0.04 p.p.h.p. DBTD
[10]0.59 p.p.h.p. Dabco 33LV,0.04 p.p.h.p. DBTD
[11]0.50 p.p.h.p. Dabco 33LV,0.04 p.p.h.p. DBTD
[12]1.20 p.p.h.p. Dabco 33LV,0.03 p.p.h.p. DBTD
[13]0.59 p.p.h.p. Dabco 33LV,0.04 p.p.h.p. DBTD

EXAMPLE 33

In this example the solubility of phenyl stearyl trimethyl ammonium chloride in Polyol Blend II was examined at 150° F. Upon standing for one week, there was no evidence of separation of the quarternary ammonium ion from the polyol blend. Thus, the solubility of the phenyl stearyl trimethyl ammonium chloride in the Polyol Blend II is considered to be excellent.

EXAMPLES 34–36

In Example 34 the performance of dimethyl glyoxime as a mold release additive in the TDI formulation using Test Method I was evaluated. The dimethyl glyoxime provided low initial release force values when compared to the control formulation, Comparison O, which contained no internal mold release additive.

Subsequent to the above finding, dilauryl glyoxime was prepared and evaluated in both the TDI and MDI formulations using Test Method I. The dilauryl glyoxime was prepared as follows:

Into a one liter flask equipped with magnetic stirrer, water condenser and nitrogen gas bypass were charged 56.7 parts dilauryl-diketone, 56.7 parts of hydroxylamine hydrochloride, 600 parts of ethanol, and 160 parts of pyridine. The mixture was heated at reflux temperature for 6 hours and allowed to cool to room temperature. The solvents were then removed by vacuum distillation. The product was extracted with n-hexane/water to remove pyridinium hydrochloride. The n-hexane-product layer was dried with calcium chloride and n-hexane was removed by vaccum stripping. 46.9 parts of crude product were obtained and identified by infrared spectroscopy and titration of the vicinal dioxime group.

Although dilauryl glyoxime performed as an effective mold release additive in the TDI formulation (Example 35), it was ineffective as a mold release additive in the MDI formulation (Example 36). This result is expected in view of Examples 20–23 wherein it was shown that a fatty acid containing a long hydrocarbon chain (at least $C_{30}$ is required for effective release in the MDI formulation).

The results are presented in Table XI which follows.

TABLE XI

| Comparison/Example | 34 | 35 | 36 | O | P |
|---|---|---|---|---|---|
| Polyol Blend I | 41 g. | 41 g. | — | 41 g. | — |
| Polyol Blend I | — | — | 41 g. | — | 41 g. |
| Catalyst Blend I | 0.30 g. | 0.30 g. | — | 0.30 g. | — |
| Catalyst Blend I | — | — | 0.11 g. | — | 0.11 g. |
| Dimethyl Glyoxime | 0.61 g. | — | — | — | — |
| Dilauryl Glyoxime | — | 0.61 g[2] | 0.78 g[3] | — | — |
| Isocyanate A Prepolymer, Index | 1.05 | 1.05 | — | 1.05 | — |

TABLE XI-continued

| Comparison/Example | 34 | 35 | 36 | O | P |
|---|---|---|---|---|---|
| Isocyanate B Prepolymer, Index | — | — | 1.02 | — | 1.02 |
| Initial Release[1] | | | | | |
| Valves and Travel | | | | | |
| Maximum, lbs/in | 1.17 | 1.47 | 17 | 3.57 | 17 |
| Minimum, lbs/in | 0.50 | 0.83 | 17 | 1.53 | 17 |
| Travel, in. | 1.5 | 2.6 | 4.0 | 3.4 | 4.0 |

[1]Procedure following Test Method I
[2]Calculated weight of dilauryl glyoxime from a 71% pure sample weighing 0.86 g.
[3]Calculated weight of dilauryl glyoxime from a 71% pure sample weighing 0.96 g.

EXAMPLES 37–40

In these examples the effectiveness of carboxyalkysiloxanes as internal mold release additives in the MDI formulation was examined.

The following structural formulas were assigned to the carboxyalkylsiloxanes based upon the reactants employed in their production and based upon the acid numbers of the products:

| Acid Number of carboxy alkylsiloxanes | Structure |
|---|---|
| 16.5 | $MD_{345}D'_8M$ |
| 44.1 | $MD_{119}D'_8M$ |
| 63.1 | $MD_{78}D'_8M$ |
| 123.7 | $MD_{32}D'_8M$ | where $M = \begin{array}{c} CH_3 \\ | \\ CH_3-SiO_{\frac{1}{2}} \\ | \\ CH_3 \end{array}$ $D = \begin{array}{c} CH_3 \\ | \\ SiO \\ | \\ CH_3 \end{array} \quad D' = \begin{array}{c} CH_3 \\ | \\ SiO \\ | \\ CH_2CH_3CHCOOH \end{array}$ Two of the carboxyalkylsiloxanes having acid numbers of 63.1 (Example 39) and 123.7 (Example 40) were found to be effective mold release additives in the MDI formulation. In contrast, those with lower acid numbers of 16.5 (Example 37) and 44.1 (Example 38) had relatively high release force values and thus are considered to be less effective mold release additives.

The results are presented in Table XII which follows.

TABLE XII

| Comparison/Example | 37 | 38 | 39 | 40 |
|---|---|---|---|---|
| Polyol Blend I | 41 g. | 41 g. | 41 g. | 41 g. |
| Catalyst Blend I | 0.30 g. | 0.31 g. | 0.32 g. | 0.39 g. |
| $MD_{345}D_8'M$ | 1.67 g. | — | — | — |
| $MD_{119}D_8'M$ | — | 1.67 g. | — | — |
| $MD_{78}D_8'M$ | — | — | 1.67 g. | — |
| $MD_{32}D_8'M$ | — | — | — | 1.68 g. |
| Isocyanate B Prepolymer, Index | 1.02 | 1.02 | 1.02 | 1.02 |
| Tack Free Time, sec. | 20 | 20 | — | 20 |
| Initial Release Forces and Travel[1] | | | | |
| Maximum, lbs/in | 6.67 | 6.00 | 2.00 | 2.07 |
| Minimum, lbs/in | 4.60 | 2.00 | 0.57 | 0.97 |
| Travel, in. | 3.6 | 2.6 | 1.3 | 1.2 |

[1]Procedure following Test Method I

What is claimed is:

1. A method for producing a polyurethane elastomer which comprises forming in a mold cavity having metal walls and curing a reaction mixture containing:
   (a) a polyol,
   (b) an organic polyisocyanate in an amount that provides from 0.8 to 1.3 isocyanato groups per active-hydrogen in the reaction mixture,
   (c) a catalytic amount of catalyst for curing of the reaction mixture to produce the elastomer, and
   (d) a mold release additive that is selected from the group consisting of:
   (I) carboxyalkylsiloxanes of the formula:

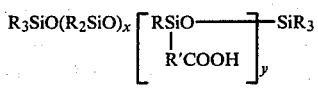

wherein R is a monovalent hydrocarbon radical, R' is a divalent hydrocarbon radical containing up to 18 carbon atoms which separates the carboxy group from the silicon atom by at least two carbon atoms, x is an integer between 30 and 100 and y is an integer between 5 and 20 with the proviso that the acid number of the siloxane be between about 50 and about 300,
   (II) an aliphatic glyoxime of the formula:

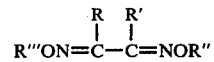

wherein R and R' are the same or different alkyl groups containing between 1 and about 20 carbon atoms per group, and wherein R" and R''' are hydrogen or alkyl radical containing between 1 and about 15 carbon atoms per group, and
   (III) an aryl modified aliphatic quaternary ammonium salt containing between about 15 and about 50 carbon atoms per molecule,
said reaction mixture containing (d) in an amount effective to impart to said elastomer the property of self-release from the walls of said mold cavity.

2. A method as claimed in claim 1 for molding a non-cellular polyurethane.

3. A method as claimed in claim 1 for producing a microcellular polyurethane wherein there is also employed:
(e) a blowing agent in an amount sufficient to produce a microcellular structure in the elastomer.

4. A method as claimed in claim 1 for molding a non-cellular polyurethane elastomer using the mold release additive (d) (I) of claim 1.

5. A method as claimed in claim 1 for producing microcellular polyurethane elastomer using the mold release additive (d) (I) of claim 1 wherein there is also employed:

(e) a blowing agent in an amount sufficient to produce a microcellular structure in the elastomer.

6. A non-cellular elastomer produced by the process of claim 4.

7. A microcellular elastomer produced by the process of claim 5.

8. A method as claimed in claim 1 for molding a non-cellular polyurethane elastomer using the mold release additive (d) (II) of claim 1.

9. A method as claimed in claim 1 for producing a microcellular polyurethane elastomer using the mold release additive (d) (II) of claim 1 wherein there is also employed:
(e) a blowing agent in an amount sufficient to produce a microcellular structure in the elastomer.

10. A non-cellular elastomer produced by the process of claim 8.

11. A microcellular elastomer produced by the process of claim 9.

12. A method as claimed in claim 1 for molding a non-cellular polyurethane elastomer using the mold release additive (d) (III) of claim 1.

13. A method as claimed in claim 1 for producing a microcellular polyurethane elastomer using the mold release additive (d) (III) of claim 1 wherein there is also employed:
(e) a blowing agent in an amount sufficient to produce a microcellular structure in the elastomer.

14. A non-cellular elastomer produced by the process of claim 12.

15. A microcellular elastomer produced by the process of claim 13.

16. A method as claimed in claim 2 for molding a non-cellular polyurethane elastomer wherein the mold release additive has the formula:

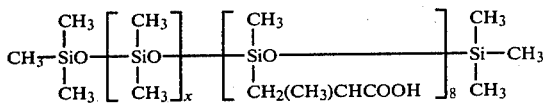

wherein x is an integer between 30 and 100.

17. A non-cellular elastomer produced by the process of claim 16.

18. A method as claimed in claim 3 for producing a microcellular polyurethane elastomer wherein the mold release additive has the formula:

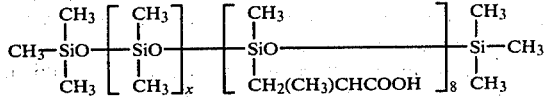

wherein x is an integer between 30 and 100.

19. A microcellular elastomer produced by the process of claim 18.

20. A method as claimed in claim 2 for molding a non-cellular polyurethane elastomer using dilauryl glyoxime as the mold release additive.

21. A method as claimed in claim 3 for producing a microcellular polyurethane elastomer using dilauryl glyoxime as the mold release additive.

22. A non-cellular elastomer produced by the process of claim 20.

23. A microcellular elastomer produced by the process of claim 21.

* * * * *

UNITED STATES PATENT AND TRADEMARK OFFICE
CERTIFICATE OF CORRECTION

PATENT NO. : 4220727
DATED : September 2, 1980
INVENTOR(S) : Godlewski

It is certified that error appears in the above—identified patent and that said Letters Patent is hereby corrected as shown below:

Column 10, line between lines 57 and 58, for "nitrile" read --units--.
Column 11, line between lines 32 and 33, for "2, 5" read --2, 4-- and line 37, for "hudroxyl" read --hydroxyl--.
Table IV, Table column 8, in row Minimum, for "1.17" read --0.17--.
Table VII, Table column psi, Mold Temp. 170°F, in row Initial, for "45" read --56-- and in row 4th, for "2" read --62--.
Table X, penultimate Table column heading, for "$M^{(j)}$" read --$M^{(5)}$--.

Signed and Sealed this

Sixth Day of January 1981

[SEAL]

Attest:

SIDNEY A. DIAMOND

Attesting Officer

Commissioner of Patents and Trademarks